(12) United States Patent
Li

(10) Patent No.: US 8,736,747 B2
(45) Date of Patent: *May 27, 2014

(54) CAMERA AUTOFOCUS ADAPTIVE BLUR MATCHING MODEL FITTING

(75) Inventor: Pingshan Li, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 196 days.

This patent is subject to a terminal disclaimer.

(21) Appl. No.: 13/350,285

(22) Filed: Jan. 13, 2012

(65) Prior Publication Data

US 2013/0182152 A1    Jul. 18, 2013

(51) Int. Cl.
*H04N 5/232* (2006.01)
*G03B 13/00* (2006.01)
*G03B 3/00* (2006.01)

(52) U.S. Cl.
USPC .................. 348/356; 348/349; 396/104

(58) Field of Classification Search
USPC ............ 348/345–349, 354–356; 396/89, 104, 396/125, 128
See application file for complete search history.

(56) References Cited

U.S. PATENT DOCUMENTS

| 6,875,972 | B2 | 4/2005 | Ortyn |
| 7,616,254 | B2 * | 11/2009 | Wong et al. .................. 348/349 |
| 8,027,582 | B2 | 9/2011 | Li |
| 2010/0053382 | A1 | 3/2010 | Kuniba |
| 2010/0053417 | A1 | 3/2010 | Bxansky |
| 2010/0194971 | A1 | 8/2010 | Li |
| 2011/0150447 | A1 | 6/2011 | Li |
| 2011/0229052 | A1 | 9/2011 | Li |
| 2011/0249173 | A1 | 10/2011 | Li |

OTHER PUBLICATIONS

Trentacoste, M. et al. —"Blur-Aware Image Downsampling" —Eurographics, vol. 30, No. 2, 2011, pp. 1-10.
Elliott, S.L. et al. —"Response normalization and blur adaptation: Data and multi-scale model" —Journal of Vision, vol. 11, No. 2, 2011, pp. 1-18.
Yang, J. et al. —"Virtual Focus and Depth Estimation From Defocused Video Sequences" —IEEE Trans. on Image Processing, vol. 19, No. 3, Mar. 2010, pp. 668-679.
United States Patent and Trademark Office, International Search Report (pp. 1-14), issued on Feb. 26, 2013 for corresponding International Patent Application No. PCT/US12/69021 with claims searched (pp. 15-19) pp. 1-19.
European Patent Office, European Supplemental Search Report (pp. 1-8), issued on Mar. 15, 2013 for European Patent Application No. EP 13150497.9-1553 with claims searched (pp. 9-11) pp. 1-11.

* cited by examiner

*Primary Examiner* — Kelly L Jerabek
(74) *Attorney, Agent, or Firm* — John P. O'Banion

(57) ABSTRACT

Autofocusing is performed in response to a weighted sum of previous blur difference depth estimates after being adaptively fitted at each focus adjustment iteration. Variance is also determined across both past and present estimations providing a confidence measure on the present focus position for the given picture. In one embodiment focus adjustment are repeated until the variance is sufficiently low as to indicate confidence that a proper focus has been attained. The method increases accuracy and speed of focusing by utilizing previous depth estimates while adapting the matching data to overcome distortion, such as due to saturation, cut-off and noise.

22 Claims, 9 Drawing Sheets

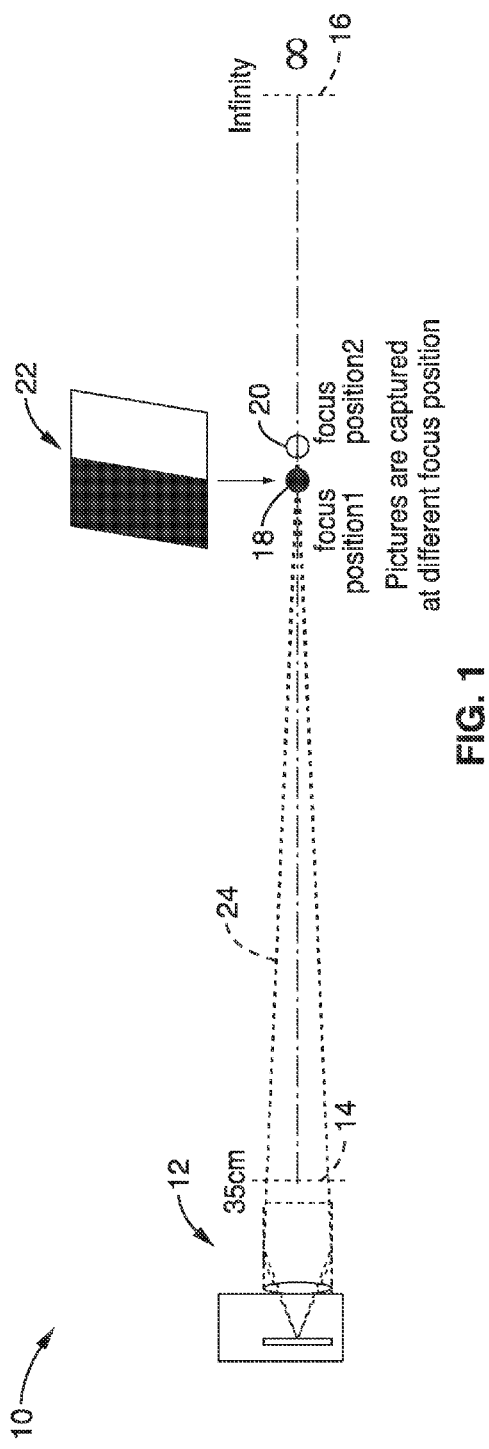
FIG. 1
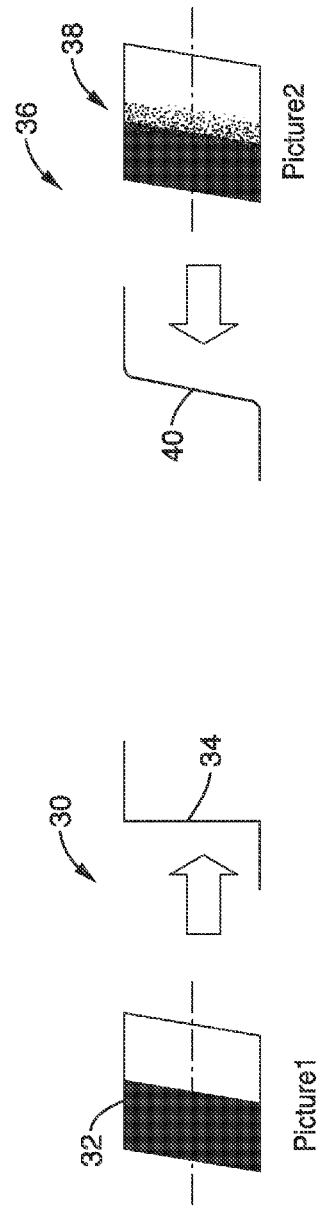
FIG. 2A
FIG. 2B

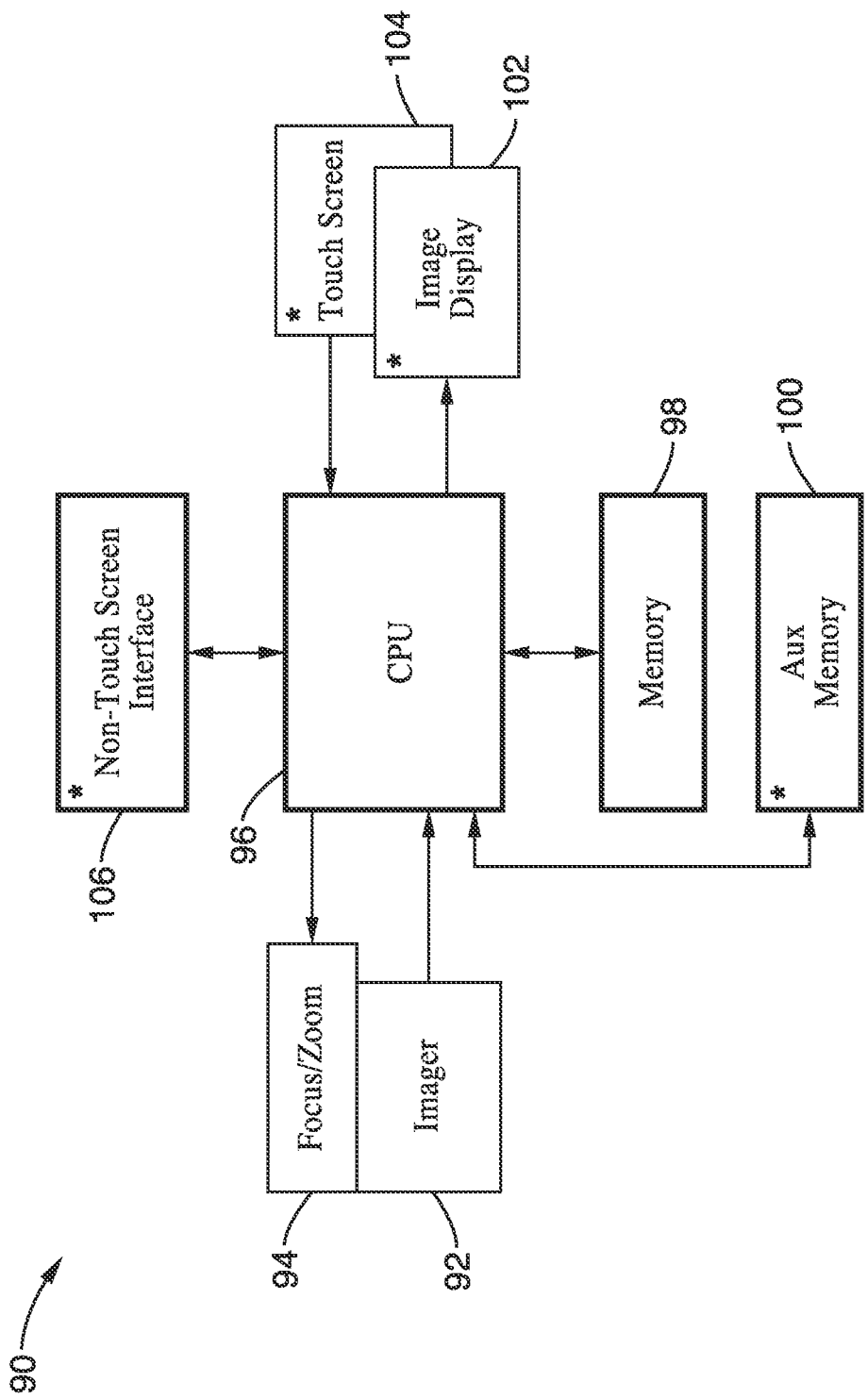

CAMERA AUTOFOCUS ADAPTIVE BLUR MATCHING MODEL FITTING

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image acquisition, and more particularly to automatic image focusing mechanisms based on blur difference in response to adaptive blur matching model fitting.

2. Description of Related Art

Image capture devices, in particular cameras, provide an automated mechanism for obtaining a correct focus on the subject. Autofocus (AF) is typically engaged in response to applying slight pressure to the shutter-release switch, such as pressing it half-way toward shutter release. In some applications, the autofocus feature continuously maintains focus, prior to capturing the image, or while capturing an image sequence or video.

During autofocus, the camera lens is automatically focusing on a three-dimensional scene and focus is controlled with respect to depth. A number of autofocus mechanisms are known in the art. One typical autofocus mechanism searches for a peak in the autofocus curve, for example utilizing the autofocus curve from image gradients. In response to the region of analysis becoming increasingly focused, image gradients become increasingly larger. It is the object of the autofocus algorithm is to obtain the peak of the autofocus curve while requiring transitions though a minimum number of camera focus positions. However, existing focus mechanisms are slow and often fail to converge on a proper focus and may continue "hunting" for a proper focal position.

Focus is perhaps the most critical metric in capturing a desired image which has led to the development of a wide range of systems for estimating or attaining proper camera focus. As a camera-lens system has a number of related elements and characteristics, a brief discussion follows of these elements and their associated characteristics.

In general terms, the two main optical parameters of a photographic lens are maximum aperture and focal length. The focal length determines the angle of view, and the size of the image relative to that of the object (subject) for a given distance to the subject (subject-distance). The maximum aperture (f-number, or f-stop) limits the brightness of the image and the fastest shutter speed usable for a given setting (focal length/effective aperture), with a smaller number indicating that more light is provided to the focal plane which typically can be thought of as the face of the image sensor in a simple digital camera.

In one form of typical simple lens (technically a lens having a single element) a single focal length is provided and this lens is also referred to as a "prime lens". In focusing a camera using a single focal length lens, the distance between lens and the focal plane is changed which results in altering the focal point where the photographic subject image is directed onto the focal plane. Thus, although the single focal length lens has a fixed optical relation and focal length, it is used in the camera to focus on subjects across a focal range span. The fixed focal distance of a lens should not be confused with the range of focal distances obtainable on a camera using that lens, and it will be noted that adjusting the position of the lens in relation to the focal plane alters focal distance.

In using a single focal length lens, the aperture is adjusted to select the amount of light with respect to desired shutter speed, and focus is adjusted according to subject-distance, which is also referred to as the focal distance, after which one or more images are captured. Often a macro setting is provided with a different focal length selection, on an otherwise single focal length lens, to allow capturing close-up shots. In contrast, a telephoto lens provides a very narrow angle of view with high magnification for filling the frame with an image of distant objects.

Multi-focal length lenses are usually referred to as "zoom" lenses, because image magnification can be "zoomed", or "unzoomed" as the case may be. Zoom lenses allow the user to select the amount of magnification of the subject, or put another way, the degree to which the subject fills the frame. It is important to understand that the zoom function of these lenses, or camera-lens systems, is conceptually separate from both the focus control and the aperture control, although in practice zoom lens operation even in the best of systems still slightly impacts other settings.

It is always necessary, however, to properly focus the lens for a given subject-distance irrespective of whether a single-focal length lens or multi-focal length lens is utilized. An acceptable range of focus for a given focus setting is referred to as "depth of field" which is a measurement of depth of acceptable sharpness in the object space, or subject space. For example, with a subject distance of fifteen feet, an acceptable range of focus for a high definition camera may be on the order of inches, while optimum focus can require even more precision. It will be appreciated that depth of field increases as the focusing moves from intermediate distances out toward "infinity" (e.g., capturing images of distant mountains, clouds and so forth), which of course at that range has unlimited depth of field.

For a single focal length lens at a given aperture setting there exists a single optimum focus setting for a given distance from camera to the subject (subject-distance). Portions of the subject which are closer or farther than the focal distance of the camera will show up in the captured images subject to an amount of blur which depends on many factors that impact depth of field. However, in a multi-focal lens there is an optimum focus point for each lens magnification (lens focal length) obtainable by the lens. To increase practicality, lens makers have significantly reduced the need to refocus in response to zoom settings, however, the necessity for refocusing depends on the specific camera-lens system in use. In addition, the aperture setting can require changing in response to different levels of zoom magnification.

In early cameras the focus could only be determined and corrected in response to operator recognition and manual focus adjustments. However, in response to the critical nature of proper focus, aids were readily adopted. In more recent times, imaging devices usually provide the ability to automatically focus on the subject, a function which is generically referred to today as "auto focus". Focus continues to be a point of intense technical development as each of the many existing auto focus mechanisms are subject to shortcomings and tradeoffs.

There are two general categories of auto focus (AF) systems which exist, (1) active auto focus and (2) passive auto focus. In active auto focus, one or more image sensors are utilized to determine distance to the focal point, or otherwise detect focus external of the image capture lens system. Active AF systems can perform rapid focusing although they will not typically provide proper focusing through windows, or in other specific applications, since sound waves and infrared light are reflected by the glass and other surfaces. In passive auto focus systems the characteristics of the viewed image are used to detect and set focus.

The majority of high-end single-lens reflex (SLR) cameras currently use through-the-lens optical AF sensors, which for example, may also be utilized as light meters. The focusing ability of these modern AF systems can often be of higher precision than that achieved manually through an ordinary viewfinder.

In one form of passive AF, phase detection is utilized, such as by dividing the incoming light through a beam splitter into pairs of images and comparing them on an AF sensor. Two optical prisms capture the light rays coming from opposite sides of the lens and divert it to the AF sensor, creating a simple rangefinder with a base identical to the diameter of the lens. Focus is determined in response to checking for similar light intensity patterns and the phase difference is calculated to determine if the object is considered in front of the focus or in back of the proper focus position.

In another type of passive AF system, contrast measurements are made within a sensor field through the lens. The system adjusts focus to maximize intensity difference between adjacent pixels which is generally indicative of correct image focus. Thus, focusing is performed until a maximum level of contrast is obtained. This form of focusing takes longer (is slower) than active AF, in particular when operating under dim light, but is a common method utilized in low end imaging devices.

Passive systems are notoriously poor at making focal decisions in low contrast conditions, notably on large single-colored surfaces (solid surface, sky, and so forth) or in low-light conditions. Passive systems are dependent on a certain degree of illumination to the subject (whether natural or otherwise), while active systems may focus correctly even in total darkness when necessary. In addition, problems arise with use of blur matching whose curves do not always fit the calibrated model.

Accordingly, a need exists for a system and method of controlling camera focusing blur matching in a more robust and deterministic manner. These needs and others are met within the present invention, which overcomes the deficiencies of previously developed autofocus systems and methods.

BRIEF SUMMARY OF THE INVENTION

The present invention teaches a blur matching method, and its use in autofocusing systems to provide rapid and accurate focusing. Previous autofocusing systems of the inventor teach utilizing two-picture matching, and multiple picture combinations in a blur matching method. The present invention teaches a mechanism for improving the blur matching used in these focusing systems by providing an adaptive model fitting algorithm. The adaptive model assures that the blur matching operates properly even when signals are distorted due to saturation, cut-off and noise, resulting in improved focusing accuracy.

The use of maximum absolute deviation can provide a measure of data fitting the focus blur model, with large deviations indicative of a mismatch between the model and matching data. The present invention teaches correcting this error by adjusting the slope of the matching data sample, or adjusting the parameters of the model.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a schematic of capturing multiple images at multiple focal points according to an aspect of the present invention.

FIGS. 2A and 2B are schematics of calibration target (e.g., step edge) images according to an aspect of the present invention.

FIG. 10 is a block diagram of a camera which performs autofocusing the weighted mean estimation method with blur matching model fitting according to an embodiment of the present invention.

DETAILED DESCRIPTION OF THE INVENTION

Figure 3:
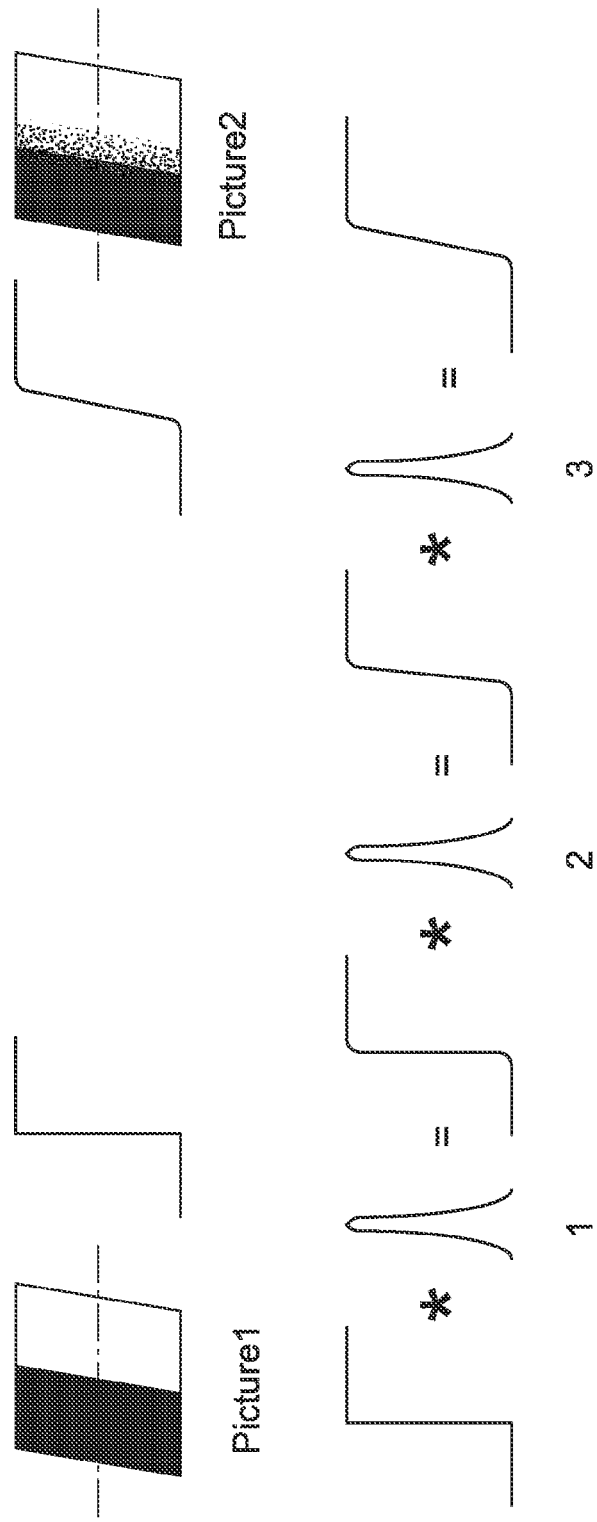
FIG. 3 is a schematic of computing blur difference in three iterations according to an aspect of the present invention.

Autofocusing utilizing two-picture or multi-picture matching is unable to provide accurate results in all circumstances, such as in response to distortion from saturation, cut-off and noise.

As the subject comes into focus, the captured image will be the sharpest, which means it has the highest contrast. The subject becomes blurrier (less contrast) as the lens moves away from the in-focus position. Generally, when two pictures are taken at two different focus distances, the one captured closer to the subject distance is sharper than the other. The focus distances at which the pictures are taken and the amount of blur difference between these pictures is utilized according to invention for estimating actual subject distance, or depth.

FIG. 1 illustrates an embodiment 10 in which multiple images are captured of a calibration target (or subject), at different focal positions (subject-distances) when characterizing a given imaging apparatus (e.g., specific make or model of camera). An imaging device (camera) 12 is shown which can focus from a minimum focal length 14 on out to infinity 16. Minimum focal distance 14 (e.g., in this case 35 cm) is shown as well as focus at infinity 16. According to the invention, the focus converges to first focal position 18 and then to a second focal position 20, upon a calibration target 22, such as step-edge image, slate, graticule, or similar target having known optical characteristics, along focal path 24. By way of example, the focusing distance of the camera ranges between the minimal focus distance (e.g., 35 cm) to infinity.

FIG. 2A depicts a condition 30 in which subject 32 is in focus, wherein the captured image is the sharpest, as represented by the sharp contrast curve 34, which is also referred to as the "edge profile" of the step edge. It will be appreciated that the calibration target, or subject, preferably provides a mechanism for simply determining the sharpness of focus based on contrast. For example in a step-edge target, a clear step-edge delineation is made between at least two colors, shades, luminances, wherein the sharpness of focus can be readily determined from the sharpness of the contrast profile. It will be appreciated by one of ordinary skill in the art that the target can be configured in any of a number of different ways, in a manner similar to the use of different chroma keys and color bar patterns in testing different aspects of video capture and output.

FIG. 2B depicts the condition 36 as the image of object 38 becomes increasingly blurry as the lens moves away from the 'in-focus' position, with a resulting sloped contrast curve 40 shown. Generally, when two pictures are taken at two different focal distances, the one taken closer to the subject-distance is sharper than the other. The focal distances at which the pictures are taken and the amount of the blur difference between these two pictures can be used to estimate the actual subject distance, or depth.

Consider the case where two pictures $f_A$ and $f_B$ are taken at positions A and B, with $f_A$ being sharper than $f_B$. The blur change can be modeled by a point spread function P from position A to B as $$f_A * P = f_B$$

where * denotes the operation of two dimensional convolution. Furthermore, the point spread function P can be approximated by using a series of convolutions by a blur kernel K:

$$P = K * K * \ldots * K. \tag{1}$$

In the testing performing herein the kernel K was chosen as:

$$K = \frac{1}{64}\begin{pmatrix} 1 & 6 & 1 \\ 6 & 36 & 6 \\ 1 & 6 & 1 \end{pmatrix} \tag{2}$$

whereby the amount of blur difference between $f_A$ and $f_B$ can be measured by the number of convolutions in Eq. (1). In actual implementation, the blur difference is obtained by an iterative process.

$$I_{A\_B} = \underset{l}{\mathrm{argmin}} \left\| f_A * \underbrace{K * K * \ldots * K}_{l \text{ convolutions}} - f_B \right\| \tag{3}$$

where $\|\cdot\|$ denotes a norm operator that evaluates the blur matching error between $f_A$ and $f_B$.

A matching curve is a relationship between the iteration number and the lens focusing position. In order to obtain the matching curve for a given depth, a sequence of pictures is taken for the whole focus range of the lens, after which the blur difference is calculated between every two pictures. The first picture of the sequence is taken at the focus distance of infinity, then one picture is taken every time the lens is moved to focus at one depth of field closer, until the lens reaches minimal focus distance. This sequence of pictures is denoted by $f_0, f_1, \ldots, f_{N-1}$, where N is the length of the sequence.

Estimating depth utilizing blur matching is performed in response to matching curve characteristics. It will be appreciated that the characteristics can be modeled by linear slopes or polynomials. During the autofocus process, pictures are taken at different focus positions. The blur difference between each two pictures is calculated, and the matching curve model utilized to estimate the depth.

In autofocus applications, the lens is traditionally moved to focus at the estimated distance, then the new depth is estimated in the same manner. The procedure is then preferably repeated until the iteration number converges to 0 (in-focus), or alternatively below some specified threshold. The best result of these estimated distances is considered to be the most recent depth estimation. This "most-recent-estimation" approach, however, suffers from several drawbacks: (1) convergence is not guaranteed; (2) there is no assurance that the next depth estimation will provide more accuracy; (3) it is a slow process, especially when the matching curve is noisy; and (4) the method doesn't properly handle situations in which the blur difference result is faulty (e.g., an outlier).

In view of the above shortcomings, the estimation is performed across multiple images as described in previous applications of the inventors to readily obtain accurate focus.

The depth estimation error is designed as $$e = d - f \tag{4}$$

where d is estimated subject depth, and f is the actual subject depth. The error e is modeled using a Gaussian distribution $e \sim N(\mu, \sigma^2)$, in which the mean value $\mu$ represents the amount of estimation bias, while variance $\sigma^2$ is a measure of confidence level. The smaller the value of $\sigma^2$, the more confidence is provided by the estimation result.

When the lens position is moving farther from the actual in-focus position, then absolute value of the iteration number is larger and the confidence level of the depth estimation result is generally lower.

Accordingly, blur matching is preferably performed by combining estimation results when more than one lens movement is required during autofocusing, whereby both past and present focus estimates are utilized instead of only the most recent estimate which is based on only two pictures. The purpose for this can be understood as follows.

Suppose N pairs of images have already been captured during autofocus process and N unbiased depth estimation results $d_1, \ldots, d_N$ have been obtained with $d_i \sim N(\mu, \sigma_i^2)$. The mean value $\mu$ is the actual subject depth. Assuming $d_i$, as depth estimations from the ith image pair, are independent, given $\sigma_i^2$, the Maximum Likelihood Estimation (MLE) of $\mu$ is given by the weighted mean:

$$\bar{d} = \frac{\sum_{i=1}^{N}(d_i/\sigma_i^2)}{\sum_{i=1}^{N}(1/\sigma_i^2)} \qquad (5)$$

$$\sigma_{\bar{d}}^2 = \frac{1}{\sum_{i=1}^{N}(1/\sigma_i^2)}. \qquad (6)$$

This variance $\sigma_{\bar{d}}^2$ is smaller than any individual variance $\sigma_i^2$ for $d_i$, which means that the weighted mean $\bar{d}$ gives more confidence than any individual $d_i$ does. Therefore $\bar{d}$ is preferably utilized as a basis for autofocus instead of relying on only the most recent estimation. The convergence condition for this autofocus process arises in response to sufficient confidence in $\bar{d}$, or when $\sigma_{\bar{d}}^2$ is below a specified threshold. Each new estimation reduces the variance of the weighted mean. High accuracy focusing results can be obtained if enough lens movements and pictures are taken.

It should be appreciated when using the most-recent-estimation approach, that iterative lens movement needs to be stopped when it returns to a prior location, so as to prevent an infinite loop, in which convergence doesn't occur and a focus position is never attained. By contrast, in the preferred weighted mean approach, lens motion need not be stopped, as each new estimation leads to an increasing confidence level and improved focus.

For the most-recent-estimation method, the convergence condition arises when the iteration number is 0, or nearly 0, yet it does not function properly in response to noisy matching curves, an issue addressed fully in later section.

If the depth estimation result is no better than using a random "guess", then the estimation provides no (zero) confidence. Technically, the confidence level is zero when the variance is infinity (uniform distribution).

Use of the weighted-mean method, or similar multiple estimator approaches, can provide information about focal confidence, from which appropriate action can be taken during autofocusing to prevent errant results. By way of example and not limitation, options for handling a no-confidence-estimation, include: (1) assign a large variance (e.g., 1000) to the estimation result and continue with the normal autofocus process; (2) discard this result, capture another set of images and calculate a new depth estimation; or (3) terminate the autofocus process. It should be appreciated that the ability to generate focus confidence values can be utilized in a number of different ways without departing from the teachings of the present invention.

Ideally, the blur variance difference between two images of 1 DOF apart is linear with respect to the lens focusing position.

The calibrated blur model is obtained from blur matching results of a step edge image sequence. It is expected that the blur matching curve for natural scenes will come close to fitting the calibrated blur model.

However, when signals are distorted due to saturation, cut-off and noise, the blur matching curve can deviate from that of the calibrated model. The blur matching curve may become either too steep or too flat to give reasonable depth estimation results. To overcome this shortcoming, it was necessary to develop an adaptive model fitting algorithm to adaptively adjust the slope of the data samples to fit the model, or adjust the slope of the model to fit the data.

FIG. 3 illustrates, by way of example, a blur matching process according to the invention in which three iterations are performed to match picture 2.

Figure 4:
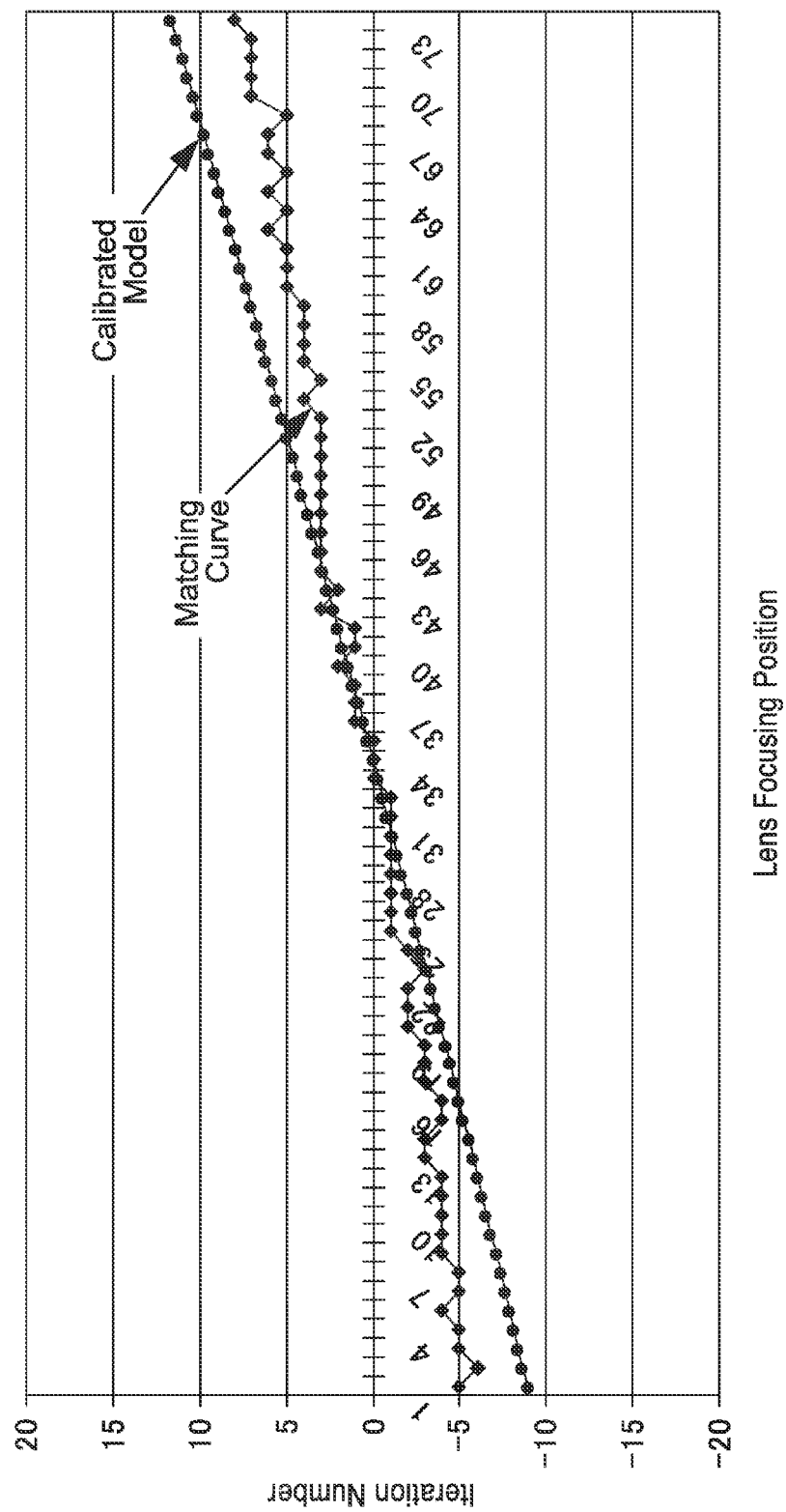
FIG. 4 is a graph of the matching curve being too flat in relation to the calibrated model, as corrected according to an embodiment of the present invention.
Figure 5:
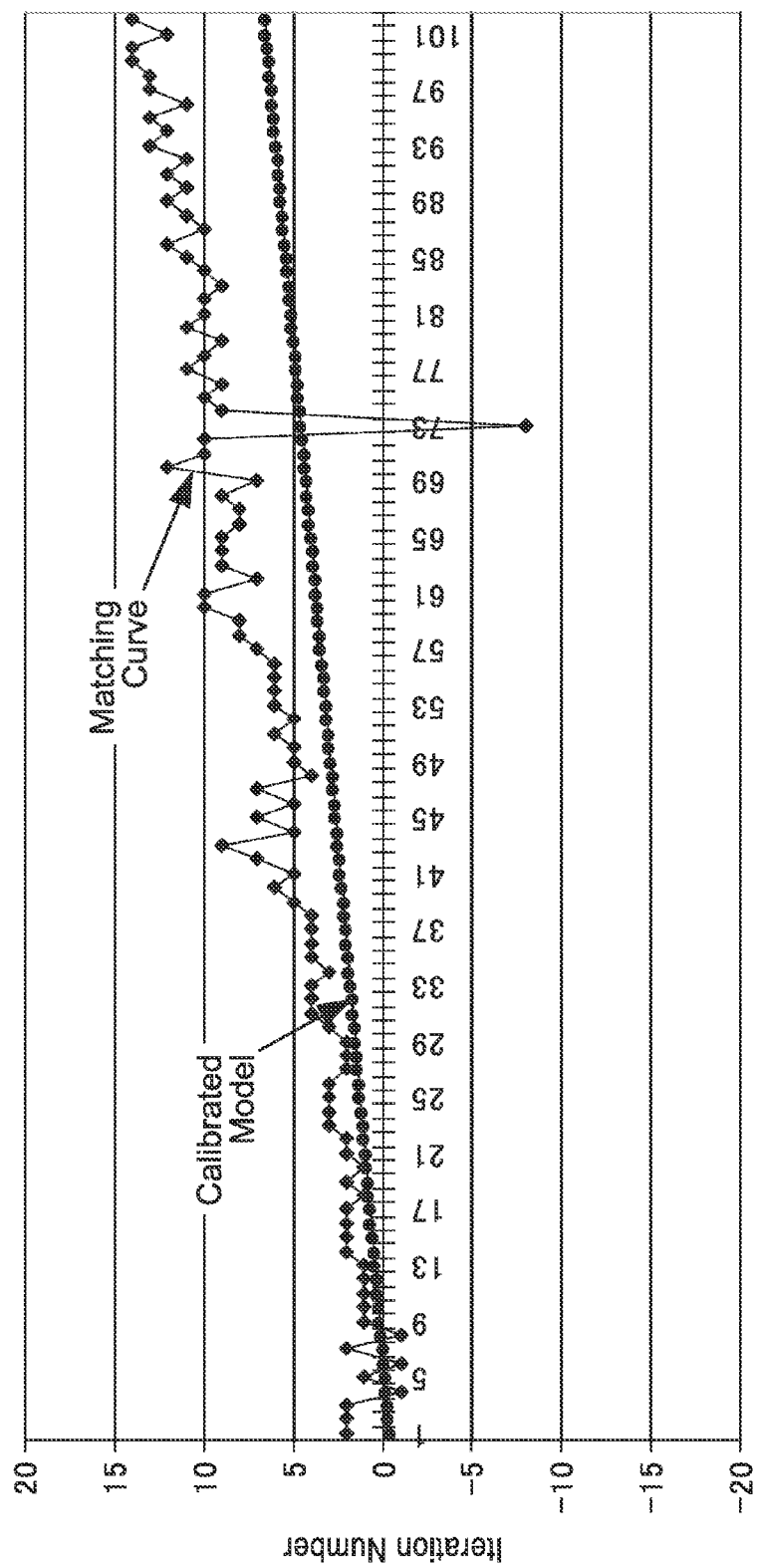
FIG. 5 is a graph of the matching curve being too steep in relation to the calibrated model, as corrected according to an embodiment of the present invention.

FIG. 4 through FIG. 5 depict examples in which the determined matching curve has a slope which is not suited to the calibrated model. In FIG. 4 the slope of the matching curve is too flat, while in FIG. 5 the slope of the matching curve is too steep.

Estimation error (AF) can be given by $e=d-\mu$ wherein e is the estimation error, N is the number of estimation results, d is the estimated focus position, and $\mu$ is the actual focus position. The error is preferably modeled with a Gaussian distribution $e \sim N(0,\sigma^2)$, with the variance $\sigma^2$ an indication of the reliability of the estimation result, which is referred to as the confidence level.

Toward achieving accurate focusing results and assuring convergence, it is preferably to combine all available estimation results. It will be noted that autofocus in response to single depth estimation utilizes only the most recent estimation value. However, when more than one lens movement is required during the auto focus (AF) process, then it is beneficial to use all the data collected instead of just the most recent two pictures.

Suppose that unbiased estimation results $d_1, \ldots, d_N$ have been collected with $d_i = N(\mu, \sigma_i^2)$. Because the mean value of $\mu$ is the actual focus position, it is problematic to estimate $\mu$ for the estimation sample $d_i$ given $\sigma_i^2$.

In one preferred embodiment a weighted mean is utilized. Assuming that $d_i$ are independent, the Maximum Likelihood Estimation (MLE) of $\mu$ is given by the weighted mean:

$$\bar{d} = \frac{\sum_{i=1}^{N}(d_i/\sigma_i^2)}{\sum_{i=1}^{N}(1/\sigma_i^2)} \qquad (7)$$

whereby the variance of the weight mean is given by $$\sigma_{\bar{d}}^2 = \frac{1}{\sum_{i=1}^{N}(1/\sigma_i^2)}. \qquad (8)$$

Maximum absolute deviation is utilized according to a preferred embodiment of the invention to evaluate how accurately the data fits the model.

$$D_V = \max_{i \in \{1,\ldots,N\}} \frac{|d_i - \bar{d}|}{\sigma_i} \qquad (9)$$

It should be appreciated that a large value of $D_V$ indicates there may be a mismatch between the model and the matching data. The present invention teaches the use of two different ways to correct this mismatch: (1) adjust the slope of the matching data sample to match the model, or (2) adjust the parameters of the model so that the model fits the data.

Figure 6:
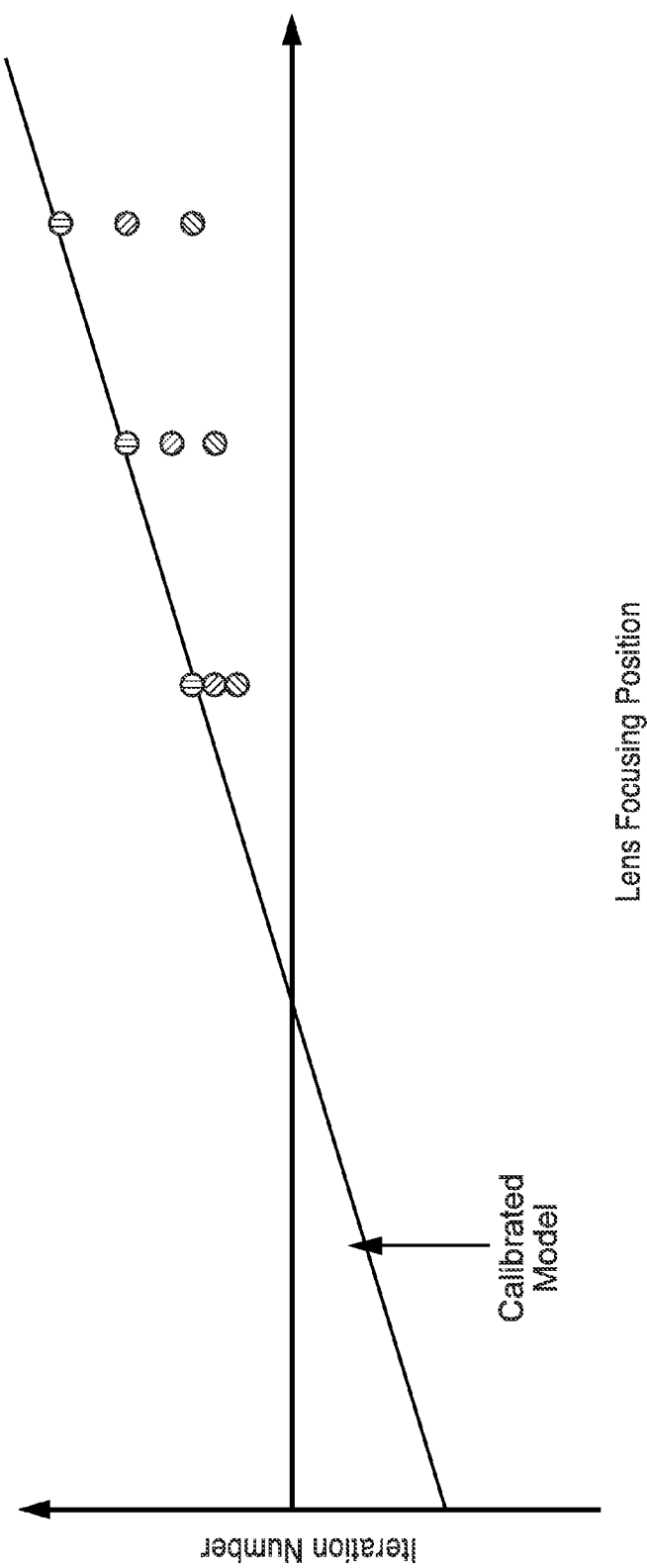
FIG. 6 is a graph of slope correction of matching data according to an embodiment of the present invention.

FIG. 6 illustrates the operation of slope correction of matching data according to the invention. Slope correction of blur matching data is multiplication of the matching iteration numbers by a constant so that these data points to more accurately fit the calibrated model of blur matching.

In testing matching curves on the present invention, the initial correction factor is set to be 1. For the given set of depth estimation results, the maximum absolute deviation $D_V$ is calculated. If $D_V$ is larger than a specified threshold, the initial correction factor is then updated by multiplying it by a correction value, such as one selected from a predetermined set of constants, for instance 1.25, 1.0 and 0.8 respectively as utilized in the example embodiment. A correction factor is preferably chosen which yields the lowest value of maximum absolute deviation. In the case of the three example correction factors, for the given set of the initial iteration numbers, each iteration number is multiplied by the correction factor and maximum absolute deviation is then recalculated. The correction factor that results in the smallest maximum absolute deviation is chosen. Slope correction is performed when new pictures are captured and a new estimation is added to the weighted mean calculation. The chosen correction factor for the current set of estimation results is then used as the initial correction factor for the next round when the new estimation is added. As can be seen above, the chosen correction factor is updated every time by multiplying one of the three numbers 1.25, 1.0 and 0.8. To maintain the stability of the model, we set a bound to this chosen factor to be between 0.5 and 2.

In the figure the dots having the vertical hatching rotated 45 degrees counterclockwise (CCW dots) are the initial iteration number determined from blur matching, the dots shown with vertical hatching are the more accurately fitted iteration numbers which were corrected by a slope correction factor 1.25 in this particular example, but not by limitation as various correction factors could be utilized without departing from the teachings of the present invention. In this figure, the dots having the vertical hatching which is rotated 45 degrees clockwise (CW dots) represent an alternate slope correction value of 0.8, which was not selected as it was not well suited to the calibrated model. It should be appreciated that the slope correction as described for FIG. 6 can be generally applied to any blur matching model, such as to polynomial models.

Figure 7:
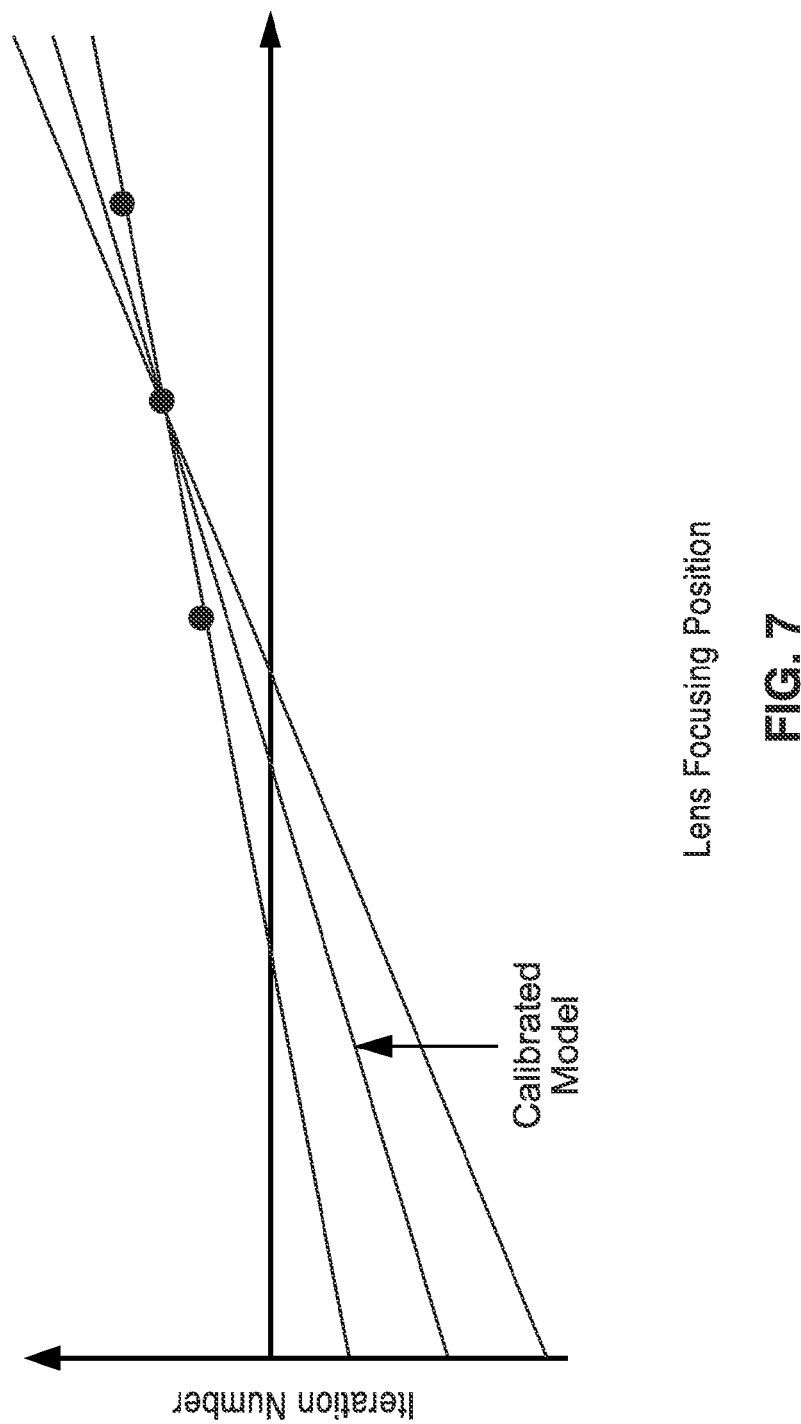
FIG. 7 is a graph of slope correction of the calibrated model according to an embodiment of the present invention.

FIG. 7 illustrates the operation of slope correction in the calibrated model according to another aspect of the invention. If the calibrated blur matching model is sufficiently linear, slope correction can be performed by multiplying the slope of the linear model by a constant correction value so that it more accurately fits the matching data samples. In performing testing of this aspect of the invention, when the maximum absolute deviation is larger than a specified threshold, it was found for the given set of iteration numbers, that multiplying the slope of the model by correction factors 1.25, 1.0 and 0.8, and selecting the factor which yields the smallest absolute deviation value as the correction to be applied to the slope, yielded improved results.

It should be appreciated that the present invention can be applied to nonlinear models as well. If the model is nonlinear, vertical stretching and compression is applied, instead of slope correction, by multiplying the iteration number in the model by a scale factor. In performing testing of this aspect of the invention, when the maximum absolute deviation is larger than a specified threshold, it was found for the given set of iteration numbers, that multiplying the scale factor for vertical stretching and compression by correction factors 1.25, 1.0 and 0.8, and selecting the factor which yields the smallest absolute deviation value as the correction to be applied to the model, yielded improved results. The initial value of scale factor before any correction should be set to 1. It will be appreciated that slope correction (or vertical stretching and compression for nonlinear model) is preferably performed once when a new estimation is added to the weighted mean calculation. In the figure shown, the dots are the matching data samples. The centermost line is the calibrated model. The line which is highest on the left of the figure is the new model obtained by selecting a slope correction factor 0.8, by way of example and not limitation, which provides the best fit between the data and the calibrated model. The modified slope (or modified scale factor) will be utilized as the initial slope (or initial scale factor) for the next round when new pictures are captured and new depth estimation is added to the weighted mean calculation. Similar to the method described in FIG. 6, the limit of overall slope correction (or the total amount of stretching and compression) can also be set to be between 0.5 and 2, which are the multiplication factors used to modify the calibrated blur matching model.

Figure 8:
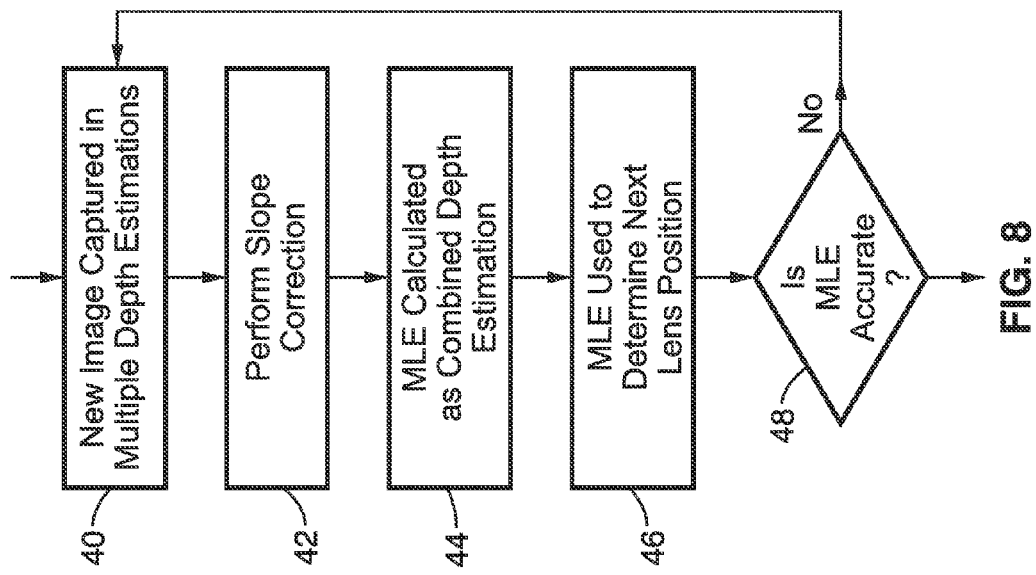
FIG. 8 is a flow diagram of performing slope correction of the blur matching depth estimation according to an embodiment of the present invention.

FIG. 8 illustrates an example of obtaining more accurate depth estimation results by performing slope correction within a multiple depth estimation process, such as utilized during autofocus adjustments within a camera. New images are captured 40, and the slopes are corrected 42, such as by either or both of the correction processes discussed in relation to FIG. 6 and FIG. 7. MLE of the depth estimations is calculated 44 and used as the combined depth estimation result, which is utilized 46 to determine the next lens position and focusing lens moves to the new position. A determination is made 48, if the MLE is sufficiently accurate, such as based on variance, then no new images need be captured to increase autofocus accuracy, otherwise a new image is captured 40 and the process repeats with new images and new slope correction.

The present invention therefore teaches the use of a weighted-mean of past and present estimation results for each iteration of lens movement, and provides improvement over estimations based on only the most-recent estimation, while increasing accuracy in response to adaptive blur matching model fitting. The adaptive blur matching is particularly well suited in an autofocusing system or method.

Figure 9:
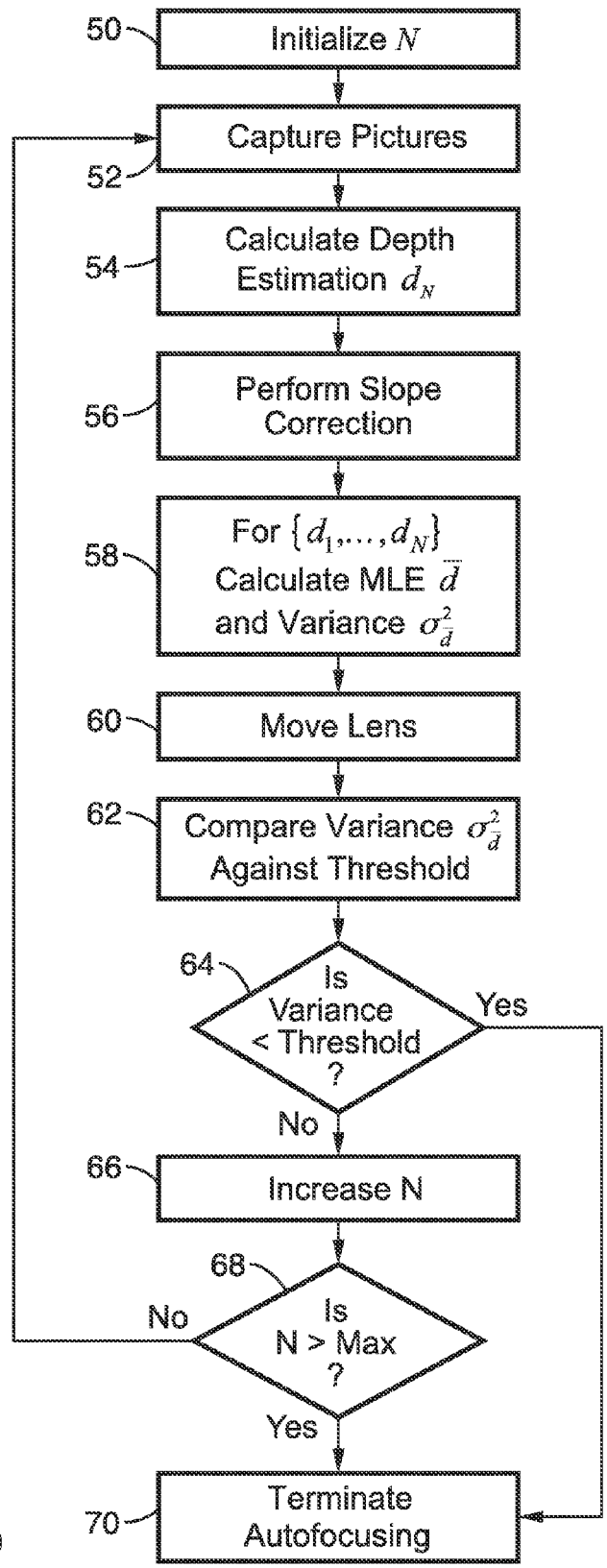
FIG. 9 is a flow diagram of performing weighted mean estimation using adaptive blur matching model fitting during autofocusing according to an embodiment of the present invention.

FIG. 9 illustrates a more detailed example embodiment of the autofocusing method of the present invention which utilizes the adaptive blur matching model fitting. In step 50 the process is initialized, with N=1. Pictures are taken as per step 52 and depth estimation $d_N$ calculated as per step 54. Slopes are corrected in step 56, such as by the mechanisms shown in FIG. 6 and FIG. 7. For all $\{d_1, \ldots, d_N\}$ MLE $\bar{d}$ and its variance $\sigma_{\bar{d}}^2$ are calculated in step 58. The lens is moved as per block 60 to a depth indicated by MLE $\bar{d}$. A comparison is performed 62 between variance $\sigma_{\bar{d}}^2$ and a specified threshold. If the variance is below the threshold (or alternatively equal to or less than the threshold) as determined at step 64, then the autofocus process is terminated at step 70. Otherwise if $\sigma_{\bar{d}}^2$ is larger, then N is increased, such as by 1 (N=N+1) in step 66. A check on the size of N is performed as per step 68, and if N is bigger than the maximum allowed number of lens movements for autofocus, the autofocus process can be terminated 70, while otherwise processing can continue back at step 52. It should be appreciated that if variance is still excessive, even though the maximum value of N has been reached (detected in step 68) then options other than termination of autofocusing can be selected without departing from the teachings of the present invention. It should be appreciated that the techniques are particularly well suited for still image cameras, although it may be utilized in video cameras in which autofocus is always active regardless of whether MLE is accurate of not, because the scenes may change during video capture.

In the above processes of FIG. 8 and FIG. 9 the number of focusing movements are counted. If it is determined that an excessive number of focuses movements have been performed, such as a number exceeding a threshold value, then autofocusing is preferably terminated at the current focus position. It should be appreciated, however, that other responses to an excessive number of focus movements can be provided, and that other focusing algorithms other than depth estimation methods may be utilized.

It should be appreciated that the present invention can be implemented on a variety of devices and systems which are configured to perform any of a number of different forms of image capture. By way of example and not limitation the following describes an embodiment within a camera device.

FIG. 10 illustrates an example embodiment 90 of an image capture device (camera) 90 configured for autofocusing utilizing adaptive blur matching according to the invention. The elements depicted (100, 102, 104, 106) with an asterisk indicate camera elements which are optional in the present invention. A focus/zoom control 94 is shown coupled to imaging optics 92 as controlled by a computer processor (e.g., one or more CPUs, microcontrollers, and/or DSPs) 96. Computer processor 96 performs the autofocusing method with adaptive blur matching in response to instructions executed from memory 98 and/or optional auxiliary memory 100. Shown by way of example for a still camera device are an optional image display 102 and optional touch screen 104, and optional non-touch screen interface 106, however, it will be appreciated that the method according to the present invention can be implemented on various image capture devices which are configured with imager, focus control, computer processor and memory. The presence of a zoom, touch-screen, image display, non-touch screen interface, and auxiliary memory are not necessary in the image capture device for practicing the present invention, but are shown as they exist on typical camera systems.

It should be appreciated that the autofocus steps generally shown in FIG. 8 and FIG. 9 are performed by computer processor 96 in combination with memory 98 and/or auxiliary memory 100.

The present invention provides methods and apparatus of camera focus control. Inventive teachings can be applied in a variety of camera apparatus and applications which require automatic focusing aspects, including still cameras, and so forth.

From the description herein, it will be further appreciated that the invention can be embodied in various ways, which include but are not limited to the following.

1. An apparatus for controlling automatic focus, comprising: (a) a computer processor configured for controlling an imaging device and associated focus control element; and (b) programming executable by said computer processor for carrying out an autofocusing process comprising: (i) capturing object images; (ii) estimating depth between captured image pairs to arrive at a depth estimation; (iii) performing slope correction between a blur matching curve and a calibrated model; (iv) determining a weighted mean of depth estimations and variance which spans both past and present depth estimations; and (v) adjusting focus with a focusing movement performed in response to said weighted mean of the depth estimations.

2. The apparatus of embodiment 1, further comprising programming executable on said computer processor for performing slope correction of blur matching data in response to multiplying matching iteration numbers by a constant to accurately fit the calibrated model of blur matching.

3. The apparatus of embodiment 1, further comprising programming executable on said computer processor for performing slope correction of a calibrated model of blur matching by multiplying slope by a constant to accurately fit matching data samples.

4. The apparatus of embodiment 1, further comprising programming executable on said computer processor for repeating steps (i) through (v) until a desired level of focus accuracy is obtained.

5. The apparatus of embodiment 4, wherein said desired level of focus accuracy is obtained when it is determined that said variance reaches a value that indicates sufficient confidence that a proper focus position has been attained.

6. The apparatus of embodiment 1, further comprising programming executable on said computer processor for terminating autofocusing at current focus position, or assigning a large variance to the estimation result and continuing to execute autofocusing, or discarding depth estimations and capturing another pair of object images from which to make another depth estimation toward continuing said autofocusing, when it is determined that an excessive number of focusing movements has been performed.

7. The apparatus of embodiment 1, wherein focus is adjusted in response to each repetition of the autofocusing process by combining present and previous depth estimations instead of only utilizing recent depth estimations.

8. The apparatus of embodiment 1, wherein said depth estimation is performed between captured image pairs, each image of which is taken at a different focus position, and estimating actual depth based on determining an amount of blur difference between captured images within the image pair.

9. The apparatus of embodiment 1, wherein said depth estimation is performed using maximum likelihood estimation (MLE) of subject depth.

10. The apparatus of embodiment 1, wherein said depth estimation is determined in response to a weighted mean $\bar{d}$ given by $$\bar{d} = \frac{\sum_{i=1}^{N}(d_i/\sigma_i^2)}{\sum_{i=1}^{N}(1/\sigma_i^2)}$$

where N represents the number of lens movements during the autofocus process, $d_i$ is depth estimation from ith image pair, and $\sigma_i^2$ is variance for $d_i$.

11. The apparatus of embodiment 1, wherein said variance comprises a measure of confidence, which is generated by said programming executable on said computer processor in response to consideration of all depth estimations made during said autofocusing process.

12. The apparatus of embodiment 1: wherein said variance comprises a measure of confidence, which is generated by said programming executable on said computer processor, in response to depth estimations which are predicted during said autofocusing process; and wherein said variance is determined as a weighted mean $\sigma_{\bar{d}}^2$ given by $$\sigma_{\bar{d}}^2 = \frac{1}{\sum_{i=1}^{N}(1/\sigma_i^2)}$$

where N represents number of unbiased depth estimations performed during said autofocusing process and $\sigma_i^2$ is variance for the i th depth estimation.

13. The apparatus of embodiment 1, wherein said apparatus is a component of a still image camera.

14. An apparatus for electronically capturing images, comprising: (a) an imaging device; (b) a focus control element coupled to said imaging device and providing a focal range to said imaging device; (c) a computer processor coupled to the imaging device and said focus control element; and (d) programming executable on said computer processor for carrying out an autofocusing process comprising: (i) capturing object images; (ii) estimating depth between captured image pairs to arrive at a depth estimation; (iii) performing slope correction between a set of blur matching results and a calibrated model when a maximum absolute deviation is larger than a predetermined threshold; (iv) determining a weighted mean of depth estimations and variance across present and past collected image pairs; and (v) adjusting focus in response to said weighted mean of the depth estimations.

15. The apparatus of embodiment 14, further comprising programming executable on said computer processor for performing slope correction of blur matching data in response to multiplying matching iteration numbers by a constant to accurately fit the calibrated model of blur matching.

16. The apparatus of embodiment 14, further comprising programming executable on said computer processor for performing slope correction of a calibrated model of blur matching by multiplying slope by a constant to accurately fit matching data samples.

17. The apparatus of embodiment 14, further comprising programming executable on said computer processor for repeating steps (i) through (v) until a desired level of focus accuracy is obtained.

18. The apparatus of embodiment 17, wherein said desired level of focus accuracy is obtained when it is determined that said variance reaches a value that indicates sufficient confidence that a proper focus position has been attained.

19. The apparatus of embodiment 14, wherein said programming executable on said computer processor is configured for estimating depth between captured image pairs in response to a focus matching model which is based on blur differences determined in response to contrast changes detected as subject distance of an object whose image is being captured changes through at least a portion of the focal range of the imaging device.

20. A method of automatically adjusting camera focus, the method comprising: (a) capturing a first object image by a camera device; (b) capturing an additional object image by the camera device; (c) estimating depth between captured image pairs in response to inputting blur difference values between captured object images into a focus matching model which is solved to generate a depth estimation; (d) performing slope correction between a set of blur matching results and a calibrated model; (e) determining the weighted mean of depth estimates and variance across past and present depth estimates; and (f) adjusting camera focus position with a camera focusing movement within an autofocusing process in response to said weighted mean of the depth estimations.

21. The method of embodiment 20, further comprising: performing slope correction of blur matching data in response to multiplying matching iteration numbers by a constant to more accurately fit the calibrated model of blur matching.

22. The method of embodiment 20, further comprising performing slope correction of a calibrated model of blur matching by multiplying slope by a constant to more accurately fit matching data samples.

It should be appreciated that programming is executable from one or more memories which are tangible (physical) computer readable media that is non-transitory in that it does not merely constitute a transitory propagating signal, but is actually capable of retaining programming, such as within any desired form and number of static or dynamic memory devices. These memory devices need not be implemented to maintain data under all conditions (e.g., power fail) to be considered herein as non-transitory media.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formula, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula (e), or computational depiction(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for controlling automatic focus, comprising:
   (a) a computer processor configured for controlling an imaging device and associated focus control element;
   (b) programming executable by said computer processor for carrying out an autofocusing process comprising:
      (i) capturing object images;
      (ii) estimating depth between captured image pairs to arrive at a depth estimation;
      (iii) performing slope correction between a blur matching curve and a calibrated model;
      (iv) determining a weighted mean of depth estimations and variance which spans both past and present depth estimations; and
      (v) adjusting focus with a focusing movement performed in response to said weighted mean of the depth estimations.

2. The apparatus recited in claim 1, further comprising programming executable on said computer processor for performing slope correction of blur matching data in response to multiplying matching iteration numbers by a constant to accurately fit the calibrated model of blur matching.

3. The apparatus recited in claim 1, further comprising programming executable on said computer processor for performing slope correction of a calibrated model of blur matching by multiplying slope by a constant to accurately fit matching data samples.

4. The apparatus recited in claim 1, further comprising programming executable on said computer processor for repeating steps (i) through (v) until a desired level of focus accuracy is obtained.

5. The apparatus recited in claim 4, wherein said desired level of focus accuracy is obtained when it is determined that said variance reaches a value that indicates sufficient confidence that a proper focus position has been attained.

6. The apparatus recited in claim 1, further comprising programming executable on said computer processor for: (i) terminating autofocusing at current focus position, or (ii) assigning a large variance to the estimation result and continuing to execute autofocusing, or (iii) discarding depth estimations and capturing another pair of object images from which to make another depth estimation toward continuing said autofocusing, when it is determined that an excessive number of focusing movements has been performed.

7. The apparatus recited in claim 1, wherein focus is adjusted in response to each repetition of the autofocusing process by combining present and previous depth estimations instead of only utilizing recent depth estimations.

8. The apparatus recited in claim 1, wherein said depth estimation is performed between captured image pairs, each image of which is taken at a different focus position, and estimating actual depth based on determining an amount of blur difference between captured images within the image pair.

9. The apparatus recited in claim 1, wherein said depth estimation is performed using maximum likelihood estimation (MLE) of subject depth.

10. The apparatus recited in claim 1, wherein said depth estimation is determined in response to a weighted mean $\bar{d}$ given by $$\bar{d} = \frac{\sum_{i=1}^{N}(d_i/\sigma_i^2)}{\sum_{i=1}^{N}(1/\sigma_i^2)}$$

in which N represents the number of lens movements during the autofocus process, $d_i$ is depth estimation from ith image pair, and $\sigma_i^2$ is variance for $d_i$.

11. The apparatus recited in claim 1, wherein said variance comprises a measure of confidence, which is generated by said programming executable on said computer processor in response to consideration of all depth estimations made during said autofocusing process.

12. The apparatus recited in claim 1:
   wherein said variance comprises a measure of confidence, which is generated by said programming executable on said computer processor, in response to depth estimations which are predicted during said autofocusing process; and
   wherein said variance is determined as a weighted mean $\sigma_{\bar{d}}^2$ given by $$\sigma_{\bar{d}}^2 = \frac{1}{\sum_{i=1}^{N}(1/\sigma_i^2)}$$

in which N represents number of unbiased depth estimations performed during said autofocusing process and $\sigma_i^2$ is variance for the ith depth estimation.

13. The apparatus recited in claim 1, wherein said apparatus is a component of a still image camera.

14. An apparatus for electronically capturing images, comprising:
   (a) an imaging device;
   (b) a focus control element coupled to said imaging device and providing a focal range to said imaging device;
   (c) a computer processor coupled to the imaging device and said focus control element;
   (d) programming executable on said computer processor for carrying out an autofocusing process comprising:
      (i) capturing object images;
      (ii) estimating depth between captured image pairs to arrive at a depth estimation;
      (iii) performing slope correction between a set of blur matching results and a calibrated model when a maximum absolute deviation is larger than a predetermined threshold;
      (iv) determining a weighted mean of depth estimations and variance across present and past collected image pairs; and
      (v) adjusting focus in response to said weighted mean of the depth estimations.

15. The apparatus recited in claim 14, further comprising programming executable on said computer processor for performing slope correction of blur matching data in response to multiplying matching iteration numbers by a constant to accurately fit the calibrated model of blur matching.

16. The apparatus recited in claim 14, further comprising programming executable on said computer processor for performing slope correction of a calibrated model of blur matching by multiplying slope by a constant to accurately fit matching data samples.

17. The apparatus recited in claim 14, further comprising programming executable on said computer processor for repeating steps (i) through (v) of claim 14 until a desired level of focus accuracy is obtained.

18. The apparatus recited in claim 17, wherein said desired level of focus accuracy is obtained when it is determined that said variance reaches a value that indicates sufficient confidence that a proper focus position has been attained.

19. The apparatus recited in claim 14, wherein said programming executable on said computer processor is configured for estimating depth between captured image pairs in response to a focus matching model which is based on blur differences determined in response to contrast changes detected as subject distance of an object whose image is being captured changes through at least a portion of the focal range of the imaging device.

20. A method of automatically adjusting camera focus, comprising:
   (a) capturing a first object image by a camera device;
   (b) capturing an additional object image by the camera device;
   (c) estimating depth between captured image pairs in response to inputting blur difference values between captured object images into a focus matching model which is solved to generate a depth estimation;
   (d) performing slope correction between a set of blur matching results and a calibrated model;
   (e) determining the weighted mean of depth estimates and variance across past and present depth estimates; and
   (f) adjusting camera focus position with a camera focusing movement within an autofocusing process in response to said weighted mean of the depth estimations.

21. The method recited in claim 20, further comprising:
   performing slope correction of blur matching data in response to multiplying matching iteration numbers by a constant to more accurately fit the calibrated model of blur matching.

22. The method recited in claim 20, further comprising performing slope correction of a calibrated model of blur matching by multiplying slope by a constant to more accurately fit matching data samples.

* * * * *